United States Patent [19]
Bliek et al.

[11] Patent Number: 5,813,528
[45] Date of Patent: Sep. 29, 1998

[54] FISHING TACKLE STORAGE SYSTEM

[76] Inventors: Ken Bliek, 32518 Hidden Acres Dr., Sioux City, Iowa 51108; Gary Book, 3037 Floyd Blvd., Sioux City, Iowa 51105

[21] Appl. No.: 806,650

[22] Filed: Feb. 26, 1997

[51] Int. Cl.⁶ .................................................. A01K 97/06
[52] U.S. Cl. ......................... 206/315.11; 43/55; 43/57.1; 312/249.2; 312/285
[58] Field of Search ........................... 206/315.11, 315.1, 206/372, 373; 43/54.1, 57.1, 55, 57.3; 220/4.26, 4.27; 312/202, 249.2, 285

[56] References Cited

U.S. PATENT DOCUMENTS

| | | |
|---|---|---|
| 1,759,051 | 5/1930 | Henderson ............................... 312/285 |
| 3,378,134 | 4/1968 | Wilkinson et al. ....................... 43/54.1 |
| 3,850,487 | 11/1974 | Batchelor ............................. 312/249.2 |
| 3,880,484 | 4/1975 | Sicina ..................................... 312/202 |
| 4,023,304 | 5/1977 | Singer . |
| 4,067,607 | 1/1978 | Battles . |
| 4,126,366 | 11/1978 | Handler et al. .......................... 312/202 |
| 4,474,291 | 10/1984 | Fortson . |
| 4,756,412 | 7/1988 | Graves et al. . |
| 4,813,173 | 3/1989 | Abbotoy . |
| 4,815,483 | 3/1989 | DuGrenier et al. ..................... 220/4.27 |
| 4,999,943 | 3/1991 | Crabtree ................................... 43/54.1 |
| 5,289,940 | 3/1994 | Wisenbaugh . |
| 5,319,877 | 6/1994 | Hagen . |
| 5,337,892 | 8/1994 | Zaffina . |

Primary Examiner—Paul T. Sewell
Assistant Examiner—Luan K. Bui

[57] ABSTRACT

A new fishing tackle storage system for providing an easily expandable and configurable fishing tackle storage container permitting convenient access to stored fishing tackle. The inventive device includes upper and lower plate members rotatably mounted on a support base and storage modules removably pivotally mounted between the upper and lower plates.

19 Claims, 4 Drawing Sheets

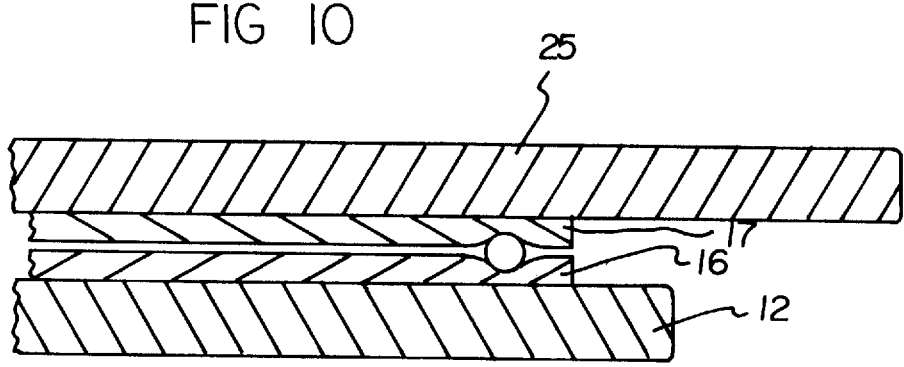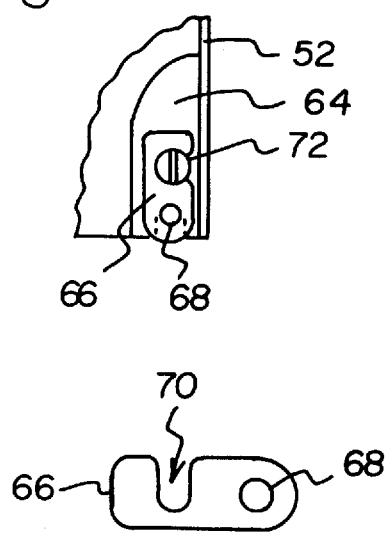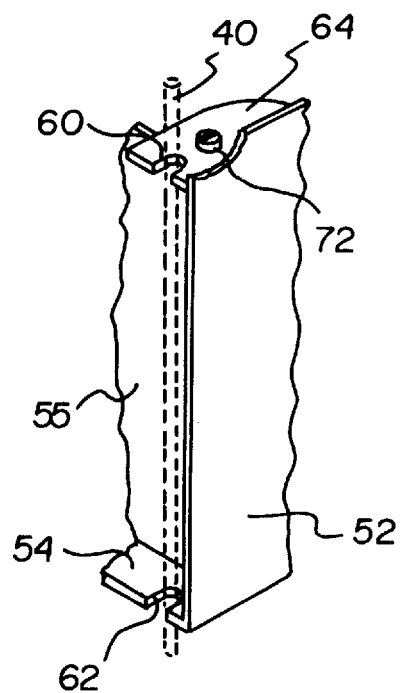

FISHING TACKLE STORAGE SYSTEM

BACKGROUND OF THE INVENTION

1. Field of the Invention

The present invention relates to fishing tackle storage containers and more particularly pertains to a new fishing tackle storage system for providing an easily expandable and configurable fishing tackle storage container permitting convenient access to stored fishing tackle.

2. Description of the Prior Art

The use of fishing tackle storage containers is known in the prior art. More specifically, fishing tackle storage containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing tackle storage containers include U.S. Pat. No. 5,337,892; U.S. Pat. No. 4,756,412; U.S. Pat. No. 4,813,173; U.S. Pat. No. 5,319,877; U.S. Pat. No. 5,289,940, U.S. Pat. No. 4,067,607, U.S. Pat. No. 4,474,291, and U.S. Pat. No. 4,023,304.

While these devices fulfill their respective, particular objectives and requirements, the aforementioned patents do not disclose a new fishing tackle storage system. The inventive device includes upper and lower plate members rotatably mounted on a support base and storage modules removably pivotally mounted between the upper and lower plates.

In these respects, the fishing tackle storage system according to the present invention substantially departs from the conventional concepts and designs of the prior art, and in so doing provides an apparatus primarily developed for the purpose of providing an easily expandable and configurable fishing tackle storage container permitting convenient access to stored fishing tackle.

SUMMARY OF THE INVENTION

In view of the foregoing disadvantages inherent in the known types of fishing tackle storage containers now present in the prior art, the present invention provides a new fishing tackle storage system construction wherein the same can be utilized for providing an easily expandable and configurable fishing tackle storage container permitting convenient access to stored fishing tackle.

The general purpose of the present invention, which will be described subsequently in greater detail, is to provide a new fishing tackle storage system apparatus and method which has many of the advantages of the fishing tackle storage containers mentioned heretofore and many novel features that result in a new fishing tackle storage system which is not anticipated, rendered obvious, suggested, or even implied by any of the prior art fishing tackle storage containers, either alone or in any combination thereof.

To attain this, the present invention generally comprises upper and lower plate members rotatably mounted on a support base and storage modules removably pivotally mounted between the upper and lower plates.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing tackle storage system apparatus and method which has many of the advantages of the fishing tackle storage containers mentioned heretofore and many novel features that result in a new fishing tackle storage system which is not anticipated, rendered obvious, suggested, or even implied by any of the prior art fishing tackle storage containers, either alone or in any combination thereof.

It is another object of the present invention to provide a new fishing tackle storage system which may be easily and efficiently manufactured and marketed.

It is a further object of the present invention to provide a new fishing tackle storage system which is of a durable and reliable construction.

An even further object of the present invention is to provide a new fishing tackle storage system which is susceptible of a low cost of manufacture with regard to both materials and labor, and which accordingly is then susceptible of low prices of sale to the consuming public, thereby making such fishing tackle storage system economically available to the buying public.

Still yet another object of the present invention is to provide a new fishing tackle storage system which provides in the apparatuses and methods of the prior art some of the advantages thereof, while simultaneously overcoming some of the disadvantages normally associated therewith.

Still another object of the present invention is to provide a new fishing tackle storage system for providing an easily expandable and configurable fishing tackle storage container permitting convenient access to stored fishing tackle.

Yet another object of the present invention is to provide a new fishing tackle storage system which includes upper and lower plate members rotatably mounted on a support base and storage modules removably pivotally mounted between the upper and lower plates.

Still yet another object of the present invention is to provide a new fishing tackle storage system with fishing tackle storage modules that are selectively mountable and dismountable from the fishing tackle storage container to thereby provide numerous configurations of tackle storage compartments for accepting a variety of different sizes and shapes of fishing tackle.

Even still another object of the present invention is to provide a new fishing tackle storage system that is easily expandable to include additional individually accessible fishing tackle storage modules.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic top view of a retaining clip for the module of the invention.

FIG. 8 is a schematic top view of a retaining clip mounted on a broken away portion of a storage module of the invention.

FIG. 9 is a schematic perspective view of a fragmentary portion of the storage module in relation to a pivot rod of the invention.

FIG. 10 is a schematic sectional view of a fragmentary portion of the storage container particularly illustrating a preferred rotational mounting means of the invention.

DESCRIPTION OF THE PREFERRED EMBODIMENT

Figure 1:
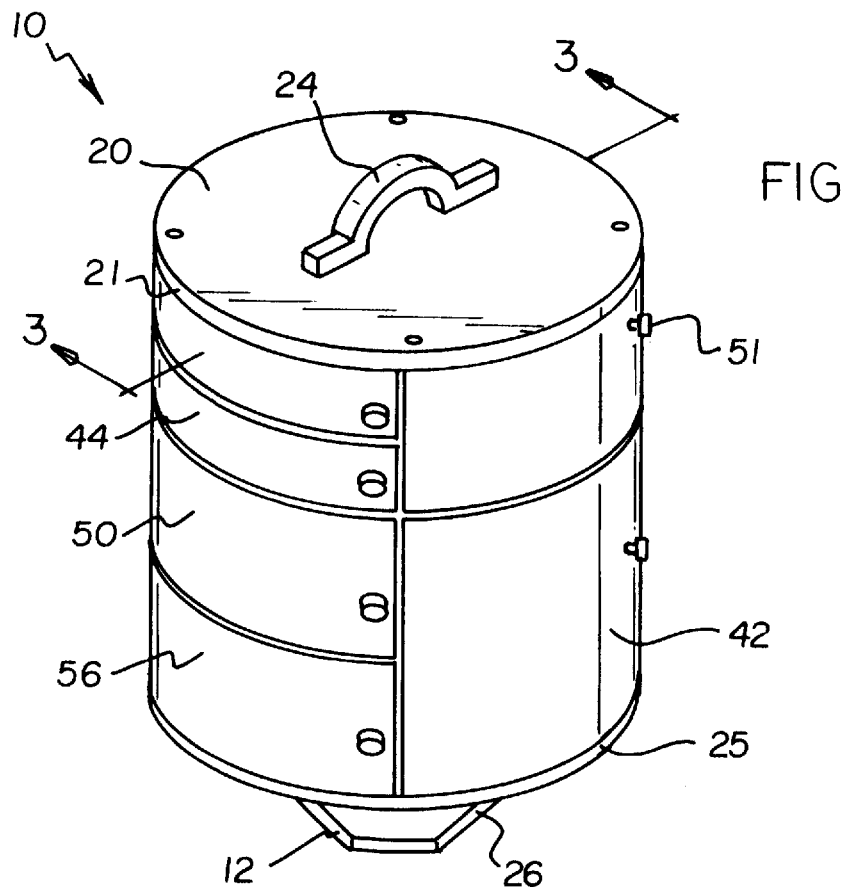
FIG. 1 is a schematic perspective view of a new fishing tackle storage system according to the present invention.
Figure 2:
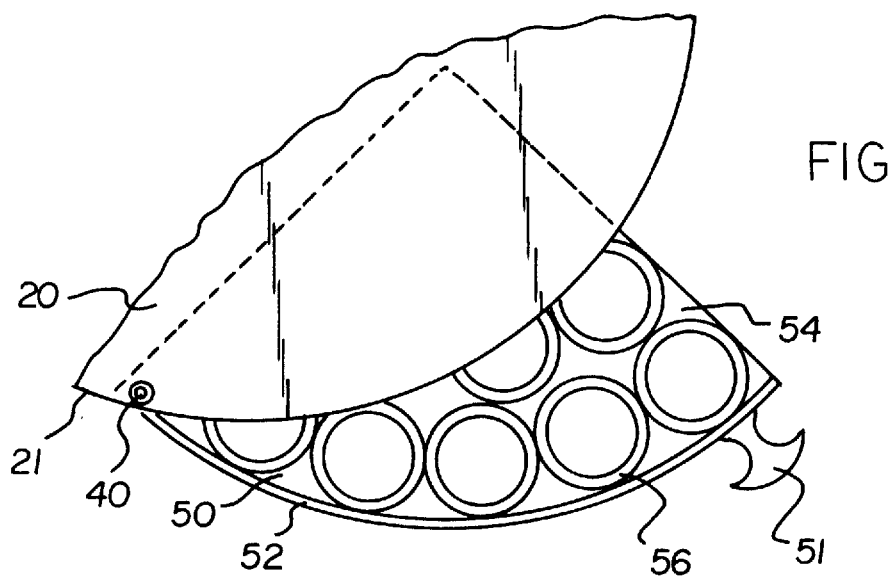
FIG. 2 is a schematic top view of a broken away portion of the fishing tackle storage system particularly illustrating a tackle storage module in a partially open position.
Figure 3:
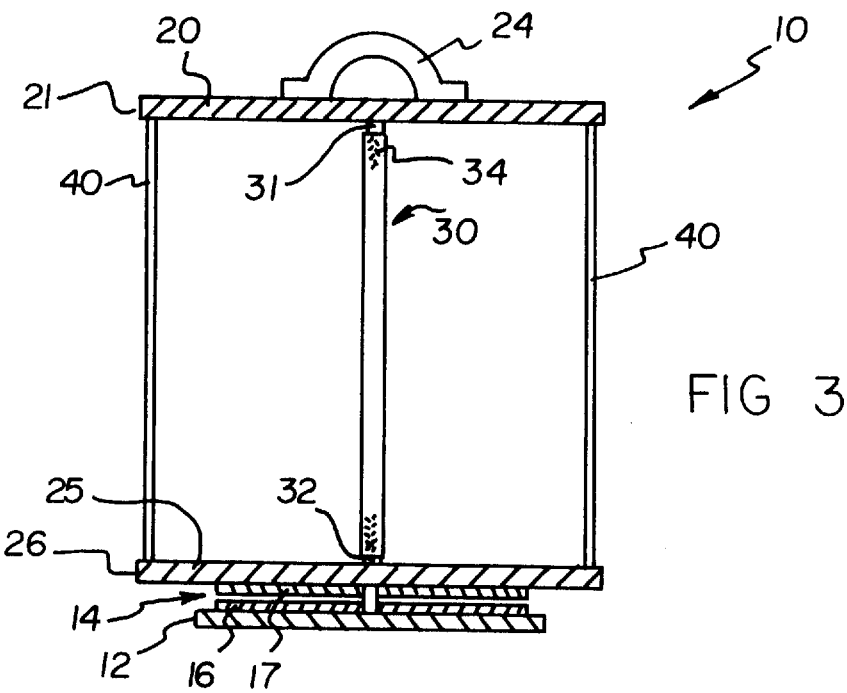
FIG. 3 is a schematic sectional view of the tackle storage system taken along line 3—3 of FIG. 1.
Figure 4:
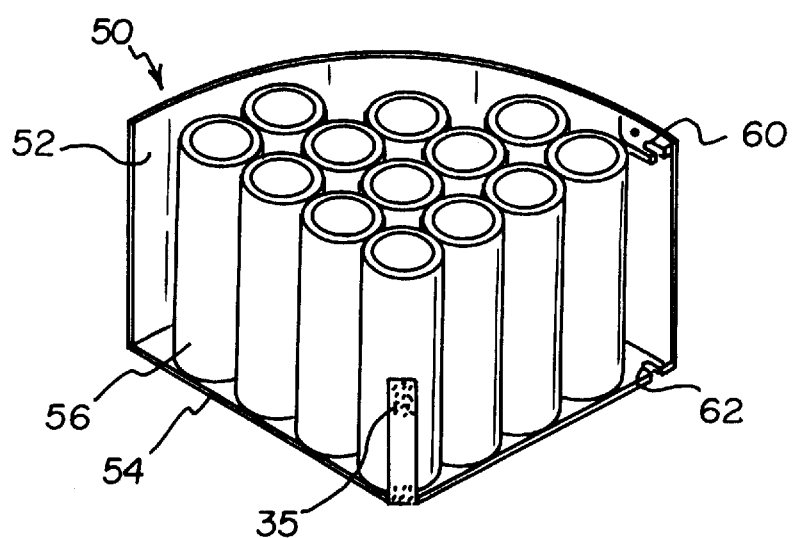
FIG. 4 is a schematic perspective view of a tackle storage module removed from the storage container particularly illustrating the cylindrical storage compartments of the present invention.
Figure 5:
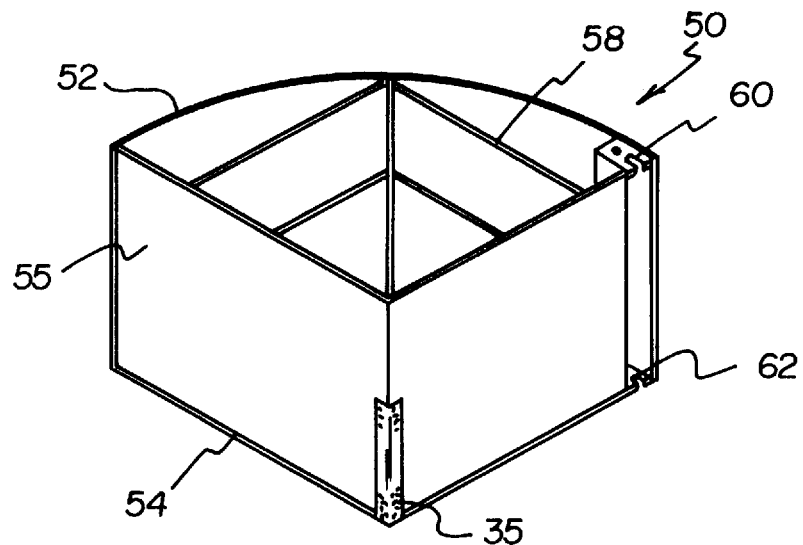
FIG. 5 is a schematic perspective view of a tackle storage module removed from the storage container particularly illustrating the module divided into individual storage compartments by partition walls.
Figure 6:
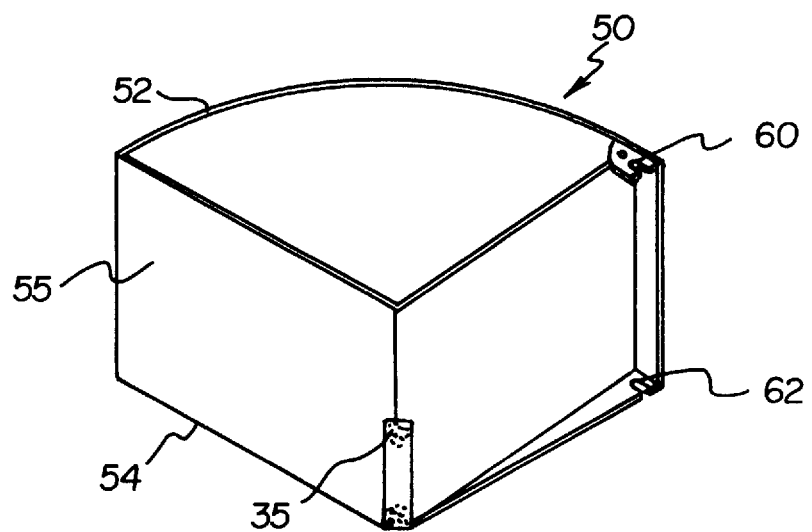
FIG. 6 is a schematic perspective view of a tackle storage module removed from the storage container particularly illustrating a storage compartment occupying substantially the entire interior of the module.

With reference now to the drawings, and in particular to FIGS. 1 through 10 thereof, a new fishing tackle storage system embodying the principles and concepts of the present invention and generally designated by the reference numeral 10 will be described.

More specifically, it will be noted that the fishing tackle storage system 10 comprises upper 20 and lower 25 plate members, a support base 12, pivot rods 40 extending between the plate members, and various storage modules 50 removably pivotally mountable on the pivot rods between the upper and lower plate members.

In particular, the fishing tackle storage system is most preferably embodied in the fishing tackle storage container 10 for storing items of fishing tackle such as, for example, fishing lures, fishing lines, reels for fishing rods, sinkers, bobbers and the like. The fishing tackle storage container 10 includes a support base 12 for supporting the storage container 10 when rested on a substantially flat surface prior to accessing items of fishing tackle contained therein. The support base 12 is preferably a substantially rectangular and substantially flat member forming a relatively broad base that resists rocking of the storage container 10 when the various parts of the container are being rotated or pivoted. Ideally, the corners of the generally rectangular support base 12 are rounded off so as not to extend beyond the outer perimeter of the lower plate member 25.

The fishing tackle storage container 10 further comprises an upper plate member 20 and a lower plate member 25, which are vertically spaced from each other and oriented parallel to each other.

The upper 20 and lower 25 plate members have outer perimeter edges 21 and 26 (respectively) defining the outermost limits of the plate members. The most preferred outer perimeter shape is substantially circular, which permits rotation of the upper 20 and lower 25 plate members without projecting corners catching on or interfering with objects or persons located close to the storage container 10. Ideally, the upper plate member 20 has a carrying handle 24 mounted on its top surface to permit the user's hand to lift the storage container 10 by grasping the handle 24, and the handle also provides a place for the user's hand to rotate the upper 20 and lower 25 plate members with respect to the support base 12.

Significantly, the lower plate member 25 is mounted on the support base 12 in a manner permitting the lower (and the upper 20) plate members to rotate about a vertical axis (i.e., an axis perpendicular to the plane of the support base 12) with respect to the support base 12. This rotational relationship permits all points along the outer perimeter of the storage container 10 to be accessible without having to lift and turn the entire container 10.

A rotational mounting means 14 is located between the lower plate member and the support base 12, and preferably comprises a first rotational mounting plate 16 fixed to the lower plate member 25 and a second rotational mounting plate 17 fixed to the support base 12. The first 16 and second 17 mounting plates are fastened together at a central location and ideally have a plurality of ball bearings or rollers (not shown) located therebetween and riding in a guidance groove in the plates 16 and 17. The preferred structure of the rotational mounting means 14 resists undesirable rocking of the lower plate member 25 with respect to the support base 12.

The storage container 10 of the invention also includes an upstanding central post 30. The elongate central post 30 has a lower end 32 and an upper end 31. The lower end 32 of the central post 30 is fixedly mounted on (although preferably not permanently united with) the lower plate member 25, preferably at a substantially central location on the lower plate member. Similarly, the upper end 31 of the central post 30 is fixedly mounted on (although preferably not permanently united with) the upper plate member 20, preferably at a substantially central location on the upper plate member.

The most preferred central post 30 comprises a cylindrical shaft, although posts with other cross sectional shapes may optionally be used.

The storage container 10 also includes at least two elongate pivot rods 40 that extend between the upper 20 and lower 25 plate members. The upper and lower ends of the pivot rods 40 are respectively fixedly mounted on (although preferably not permanently united with) the upper and lower plate members, most preferably near or at the outer perimeter edges of the plate members.

A significant feature of the invention is the employment of storage modules 50 for holding and storing items of fishing tackle. The preferred storage container 10 has at least two storage modules 50 for holding individual items of fishing tackle. Each storage module 50 is pivotally mounted on a pivot rod 40 to permit the storage module 50 to be pivoted between a closed position in which the items of fishing tackle are securely held in the storage container 10, and an open position in which items of fishing tackle may be inserted into and removed from the storage module 50. Specifically, the closed position is characterized by the storage module 50 being located between the upper 20 and lower 25 plate members and being located inside the interior space of the storage container 10 as defined by joining the outer perimeter edges 21, 26 of the upper 20 and lower 25 plate members. The open position is characterized by the storage module 50 being located substantially outward of the outer perimeter of the upper and lower plate members.

Each storage module 50 preferably includes a substantially vertical outer module wall. The outer wall 52 is most preferably curved or arcuately-shaped such that it is substantially aligned with the outer perimeter edges of the upper 20 and lower 25 plate members when the storage module 50 is in a closed position. Collectively, the arcuate outer walls 52 of the storage modules form a curved outer perimeter wall for the storage container 10. Ideally, the outer wall 52 of a storage module 50 is visually transparent to permit visual identification of the items of fishing tackle located in the storage module 50 while the storage module 50 is in a closed position.

Each storage module 50 also includes a substantially flat and horizontal bottom wall 54 fixed to the outer wall 52 so that the outer and bottom walls move as a unit. The bottom wall 54 of a storage module forms a barrier that blocks movement of tackle items out of any storage module located below the storage module.

Significantly, the storage modules 50 of the storage container 10 may have various configurations for holding items of fishing tackle having various different sizes and shapes. The structure of a basic storage module configuration includes the outer 52 and bottom 54 walls of the module with substantially vertical side walls 55 joined to the outer and bottom walls to form a single compartment suitable, for example, for carrying relatively large tackle items such as the reel for a fishing rod. Another optional storage module configuration includes a number of substantially cylindrical compartment walls 56 oriented vertically (on end) so that the bottom wall 54 forms a bottom for the cylindrical compartments. The cylindrical compartments are suitable for holding relatively elongate items of fishing tackle therein. The cylindrical storage compartments are mounted adjacent or side by side to each other, and ideally the cylindrical walls of the storage compartments are transparent to permit the user of the container 10 to look through the transparent outer wall 52 of the storage module 50 and through the cylindrical compartment wall 56 to see the tackle item or items stored in a particular storage module without have to open the storage module. Another optional storage module 50 configuration includes at least one partition wall 58 mounted in the storage module to subdivide the interior of the module into smaller storage compartments.

Preferably, the storage container will have at least two levels or tiers of storage modules, and ideally each tier of storage modules will include four storage modules. In this configuration, each module 50 occupies approximately a quarter of the circular tier storage space and has a generally pie piece shape (e.g., the bottom wall 54 of each storage module 50 has two substantially orthogonal boundaries and a curved boundary along the arcuate outer wall 52).

Significantly, the vertical size of the modules 50 may be varied from a standard, or single height, storage module size. For example, a double-height storage module 42 occupies about twice the space (in the vertical direction) of a single height module, and a half-height storage module 44 occupies about half of the vertical space of the single height storage module. Storage modules of various heights may be mixed and fit together in a storage container 10 to thereby accommodate fishing tackle of different sizes and shapes.

Preferably, securing means are provided for securing each storage module 50 in the closed position. The most preferred securing means includes a first fastening element 34 mounted on the storage module 50 and a second fastening element 35 mounted on the central post 30 so that the storage module 50 may be held in a closed position by the central post 30 and therefore is not affected by a change in the size or shape (e.g., the height of the outer wall 52) of the storage module 50. Ideally, the first 34 and second 35 fastening elements of the securing means comprise hook and loop fastener material so that the module may be secured and unsecured from the central post 30 by simply pushing the storage module 50 inward against the post or pulling the storage module 50 outward away from the post with a single hand of the user.

The preferred storage module 50 additionally comprises gripping means that may be grasped by the hand of the user to move the storage module 50 between the open and closed positions. The most preferred gripping means comprises a gripping knob 51 mounted on the outer wall 52 of the storage module 50 at a location away from the pivot rod 40. Optionally, a simpler grip means may be employed, such as an aperture (not shown) in the outer wall 52 that is sufficiently large to permit a finger of the user to be inserted into the aperture and curled to permit the finger to pull the storage module 50 into the open position. (The module 50 may then be moved into the closed position by pressing against the outer wall 52 of the module).

A significant advantage of the fishing tackle storage container 10 of the invention is the ability to reconfigure the storage container by removing and replacing individual storage modules in the container. This capability is the result of the releasable pivot hinge system of the invention which includes a hinge means and a retaining means for removably pivotally mounting a storage module on a pivot rod 40.

The hinge means of the invention functions to permit the module 50 to pivot on the pivot rod 40 between the closed and open positions. The preferred hinge means comprises a pair of substantially U-shaped notches on the module 50 in which the pivot rod 40 rides when the module is mounted on the pivot rod 40. Preferably, the pair of notches comprises an upper notch 60 and a lower notch 62. The lower notch 62 is located relatively lower on the module 50 and is most preferably located in the bottom wall 54 of the module 50.

The upper notch 60 is located relatively higher on the module 50, and is most preferably located in a substantially horizontal pivot tab 64 fixed to an upper location of the arcuate outer wall 52. The notches 60, 62 are vertically aligned so that when the pivot rod 40 is inserted in the notches the module 50 pivots in a substantially horizontal plane. Optionally, the function of the notches 60, 62 may be performed by a channel or other rod-receiving structure that permits pivotal rotation of the module with respect to the pivot rod 40.

The retaining means holds the module 50 on the pivot rod 40 when the rod is engaged by the hinge means, and may be released when removal of the module from the rod 40 (and the storage container 10) is desired. The preferred retaining means comprises a retaining clip 66 that is fixed to the pivot rod 40 in a manner permitting the clip to rotate about the rod 40, such as by a pivot hole 68 located therein which permits the pivot rod 40 to pass through the clip 66. The retaining clip 66 also has a release slot 70 spaced from the pivot hole 68. The release slot 70 is adapted to receive a fastener mounted on the module 50, and preferably the release slot 70 accepts a securing screw fastener 72 threaded into the pivot tab 64 at a location spaced from the upper notch 60 at a substantially similar distance to the spacing between the pivot hole 68 and the release slot 70 on the retaining clip 66. A single retaining clip 66 releasably mounted to an upper location on the module 50 is preferred, since the weight of the storage module 50 tends to hold the pivot rod 40 in the lower notch 62 and is usually sufficient to hold the module on the pivot rod 40. Optionally, additional retaining clips 66 may be used to mount the module 50.

In use, the storage module 50 is positioned on the storage container 10 so that the pivot rod 40 is located in the upper 60 and lower 62 notches. The retaining clip 66 is then moved into position so that the fastening screw 72 is located in the release slot 70 of the retaining clip. The screw 72 is tightened down on the clip 66 so that the module 50 is held on to retaining clip and the pivot rod 40 is held from moving out of the upper notch 60.

Optionally, the capacity of the storage container 10 may be expanded (e.g., by increasing the number of storage modules 50 that may be contained therein) by increasing the length of the central post 30 and the pivot rods 40. Preferably, a longer central post 30 and longer pivot rods 40 may be substituted for relatively shorter ones in order to increase the space between the upper and lower plate members to provide additional mounting space for additional tiers of storage modules. The preferred non-permanent mounting of the post 30 and rods 40 to the upper and lower plate members permits the substitution of longer or shorter post and rod elements for increasing the storage capacity of the storage container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing tackle storage container comprising:

a support base upper and lower plate members each having an outer perimeter and being vertically spaced and parallel with respect to each other, rotational mounting means mounted between said support base and said lower plate for permitting rotation about a vertical axis of said upper and lower plate members with respect to said support base, at least two pivot rods extending between said upper and lower plates, and at least two storage modules each said storage module being pivotally mounted on one of said pivot rods to permit said storage module to be pivoted between a closed position and an open position independently of any other said storage module, each said storage module being mounted in a manner permitting easy removal of said storage module from a mounted condition on said pivot rod and replacement by another said storage module on said pivot rod;

wherein each said storage module includes a releasable pivot hinge system for releasably pivotally mounting said storage module on a pivot rod;

wherein said releasable pivot hinge system includes hinge means comprising spaced notches on said storage module for engaging said pivot rod; and wherein said releasable pivot hinge system includes retaining means comprising a retainer clip pivotally mounted on said pivot rod, said retainer clip having a release means for releasably connecting to said storage module.

2. The fishing tackle storage container of claim 1 additionally comprising a carrying handle mounted on said upper plate member for permitting hand lifting by a user.

3. The fishing tackle storage container of claim 1 additionally comprising an upstanding central post having a lower post end mounted on said lower plate member and having an upper post end being mounted on said upper plate member.

4. The fishing tackle storage container of claim 1 comprising at least two tiers of storage modules oriented with one said tier above another said tier.

5. The fishing tackle storage container of claim 1 wherein each said pivot rod has a lower rod end mounted on said lower plate member near the outer perimeter thereof and also has an upper rod end being mounted on said upper plate member near the outer perimeter thereof.

6. The fishing tackle storage container of claim 1 wherein each said storage module comprises an outer wall substantially aligned with the outer perimeter of said upper and lower plate members, and further comprises a bottom wall fixed to and pivotally movable with said outer wall.

7. The fishing tackle storage container of claim 6 wherein the outer wall of one of said storage modules has an arcuate shape such that the curved outer walls of the storage modules collectively form a cylindrical outer perimeter wall.

8. The fishing tackle storage container of claim 6 wherein the bottom wall of one of said storage modules blocks movement by any stored items of fishing tackle out of any storage module located below said storage module.

9. The fishing tackle storage container of claim 6 wherein the outer wall of one of said storage modules is transparent to permit visual identification of the items of fishing tackle located in said storage module when said storage module is in a closed position substantially entirely between said upper and lower plate members.

10. The fishing tackle storage container of claim 1 wherein one of said storage modules includes a number of vertically-oriented cylindrical storage compartments for receiving and storing items of fishing tackle in a substantially vertical orientation.

11. The fishing tackle storage container of claim 1 including four storage modules at the same vertical level between said upper and lower plate members such that each said storage module is accessible from different locations along the outer perimeter of said upper and lower plate members.

12. The fishing tackle storage container of claim 1 including a double-height storage module for holding relatively large items of fishing tackle and including two half-height storage modules with one half-height storage module positioned vertically above the other half-height storage module.

13. The fishing tackle storage container of claim 1 wherein each storage module includes gripping means for grasping by the user's hand for moving said storage module between said open and closed positions.

14. A fishing tackle storage container, comprising:

a support base, upper and lower plate members each having an outer perimeter and being vertically spaced and parallel with respect to each other, rotational mounting means mounted between said support base and said lower plate for permitting rotation about a vertical axis of said upper and lower plate members with respect to said support base, at least two elongate pivot rods extending between said upper and lower plates, and at least two storage modules, each said storage module being pivotally mounted on one of said pivot rods to permit said storage module to be pivoted between a closed position and an open position independently of any other said storage module, each said storage module being mounted in a manner permitting individual removal of said storage module from a mounted condition on said pivot rod and replacement by another said storage module on said pivot rod;

wherein each said storage module in a mounted condition on one of said pivot rods has a height dimension measured in a direction parallel to the longitudinal extent of said pivot rod, one of said storage modules having a first height dimension and another of said storage modules having a second height dimension, the second height dimension being about double the first height dimension; and wherein the space between said upper and lower plate members has no fixed walls perpendicular to said pivot rods to thereby permit replacement of a single height storage module with a double height storage module.

15. The fishing tackle storage container of claim 14 wherein each said storage module includes a releasable pivot hinge system for releasably pivotally mounting said storage module on one of pivot rods.

16. The fishing tackle storage container of claim 15 wherein said releasable pivot hinge system includes hinge means comprising spaced notches on said storage module for engaging said pivot rod.

17. The fishing tackle storage container of claim 14 wherein each storage module additionally comprises securing means for releasably securing said storage module in a closed position substantially entirely between said upper and lower plate members, and wherein said container additionally comprises an upstanding central post extending between said upper and lower plate members, and wherein said securing means for securing said storage modules individually of other storage modules mounted on said pivot rods, wherein said securing means includes a first fastening element mounted on an interior portion of said storage module positionable adjacent said central post when said storage module is in a closed position, and a second fastening element mounted on said central post.

18. The fishing tackle storage container of claim 17 wherein the first and second fastening elements of said securing means comprises hook and loop fasteners.

19. A fishing tackle storage container, comprising:

a support base, upper and lower plate members each having an outer perimeter and being vertically spaced and parallel with respect to each other, rotational mounting means mounted between said support base and said lower plate for permitting rotation about a vertical axis of said upper and lower plate members with respect to said support base, an upstanding central post extending between said upper and lower plate members, at least two pivot rods extending between said upper and lower plates, at least two storage modules, each said storage module being pivotally mounted on one of said pivot rods to permit said storage module to be pivoted between a closed position and an open position independently of any other said storage module, each said storage module being mounted in a manner permitting easy removal of said storage module from a mounted condition on said pivot rod and replacement by another said storage module on said pivot rod, wherein said storage modules are arranged in at least two tiers of storage modules oriented with one said tier above another said tier, each said tier of storage modules comprising at least two storage modules, securing means for releasably securing a said storage module in a closed position substantially entirely between said upper and lower plate members and comprising a first fastening element mounted on said storage module and a second fastening element mounted on said central post, and a releasable pivot hinge system for each said storage module comprising hinge means including spaced notches on said storage module for engaging said pivot rod and comprising retaining means including a retainer clip pivotally mounted on said pivot rod, said retainer clip having a release means for releasably connecting to said storage module.

* * * * *